United States Patent
Finder et al.

(10) Patent No.: US 6,601,987 B2
(45) Date of Patent: Aug. 5, 2003

(54) APPARATUS FOR PREMIXING ADDITIVES AND FEEDING THEM INTO A POLYMER STREAM

(75) Inventors: Horst Finder, Rodgan (DE); Bernd Helmstorff, Wiesbaden (DE)

(73) Assignee: Zimmer AG, Frankfurt am Main (DE)

( * ) Notice: Subject to any disclaimer, the term of this patent is extended or adjusted under 35 U.S.C. 154(b) by 34 days.

(21) Appl. No.: 09/972,420

(22) Filed: Oct. 5, 2001

(65) Prior Publication Data

US 2002/0075756 A1 Jun. 20, 2002

(30) Foreign Application Priority Data

Oct. 5, 2000 (DE) .......................................... 100 49 617

(51) Int. Cl.$^7$ ................................................. B01F 5/14
(52) U.S. Cl. ....................... 366/272; 366/287; 366/336; 418/10; 418/196
(58) Field of Search ................................ 366/272, 287, 366/288, 336; 418/196, 197, 10

(56) References Cited

U.S. PATENT DOCUMENTS

| | | | | |
|---|---|---|---|---|
| 1,460,875 A | * | 7/1923 | White ........................ | 418/196 |
| 3,142,476 A | * | 7/1964 | Goodwin .................... | 366/272 |
| 3,152,792 A | * | 10/1964 | Goodwin .................... | 366/288 |
| 3,179,382 A | * | 4/1965 | Knedlik ...................... | 366/272 |
| 3,179,383 A | * | 4/1965 | Knedlik ...................... | 366/272 |
| 3,266,430 A | * | 8/1966 | Mylo ......................... | 418/10 |
| 3,362,793 A | * | 1/1968 | Massoubre .................. | 366/287 |
| 3,407,046 A | * | 10/1968 | Massoubre .................. | 366/297 |
| 3,559,956 A | * | 2/1971 | Gray .......................... | 366/272 |
| 3,870,437 A | * | 3/1975 | Gondek ...................... | 417/310 |
| 4,184,808 A | * | 1/1980 | Cobb ......................... | 418/196 |
| 5,005,982 A | * | 4/1991 | Kistner ....................... | 366/272 |
| 5,430,077 A | * | 7/1995 | Unger ........................ | 523/351 |
| 5,842,848 A | * | 12/1998 | Knowles ..................... | 418/196 |

* cited by examiner

Primary Examiner—Tony G. Soohoo
(74) Attorney, Agent, or Firm—McDonnell Boehnen Hulbert & Berghoff

(57) ABSTRACT

The invention pertains to an apparatus for premixing additives and feeding them into a polymer melt stream. The apparatus has a conducting element 2, first and a second intermediate element 4a and 4b, and a pump assembly 6, wherein the polymer melt stream is guided through channels 8 and 10 of the conducting element. The second intermediate element 4a has a feed element 12 that extends into the first channel 8 to form a ring channel. The feed element 12 is surrounded by openings 14, through which a portion of the polymer melt is drawn off, so that it can be mixed with an additive inside the pump assembly 6. This mixture is then returned via the feed element 12 to the polymer melt stream. The apparatus according to the invention makes it possible to decrease the residence times of the polymer and requires very little in the way of apparatus.

10 Claims, 6 Drawing Sheets

APPARATUS FOR PREMIXING ADDITIVES AND FEEDING THEM INTO A POLYMER STREAM

BACKGROUND OF THE INVENTION

1. Field of the Invention

The present invention pertains to an apparatus for premixing additives and for feeding them into a polymer stream.

2. Summary of the Related Art

Methods for adding additives to a polymer stream are known in the art. In *Chemiefasern/Textilindustrie*, Vol. 88, No. 36, January 1986, pp. 24–29, a process for feeding additives into a stream of polymer melt is described in which a partial stream is taken from the unmodified main melt stream emerging from a final reactor or extruder. The partial stream is then passed through a twin-shaft extruder equipped with special kneading elements. The additives are supplied to the twin-shaft extruder by a continuous metering system and blended into the partial polymer melt stream. The partial stream containing the additives is then mixed back into the main melt stream, static mixing elements being used to achieve a uniform mixture.

DE 4,039,857 A1 discloses an apparatus for direct, continuous modification of polymer melts in which, again, a partial melt stream is taken from the main melt stream and re-directed to an extruder. The additives to be supplied arrive in the extruder via a feed pump. After the partial melt stream has been modified by the incorporation of the additives, it is returned to the main melt stream.

A process for feeding additives into a polymer melt stream is known from DE 198-41,376 A1, in which a partial stream is branched off from the polymer melt stream and divided into additional partial streams. These latter partial streams are directed to a planetary gear pump, to which at least one additive is also supplied. Then the partial streams are recombined and sent through a static mixer, from which it is returned to the main melt stream.

The disadvantage of known apparatuses and processes is that areas where the polymer melt can have undesirably long dwell times (and where it is possible for the polymer melt to form deposits) are created at the point where a portion of the polymer melt is branched off from the main melt stream and at the point where the polymer melt treated with additives is returned to the main melt stream. In addition, known apparatuses require a complicated apparatus.

SUMMARY OF THE INVENTION

The present invention provides an apparatus for premixing additives and for feeding them into a polymer melt stream, which apparatus allows short polymer melt residence times and requires only a relatively simple apparatus.

BRIEF DESCRIPTIONS OF THE DRAWINGS

DETAILED DESCRIPTION OF THE INVENTION

Figure 1:
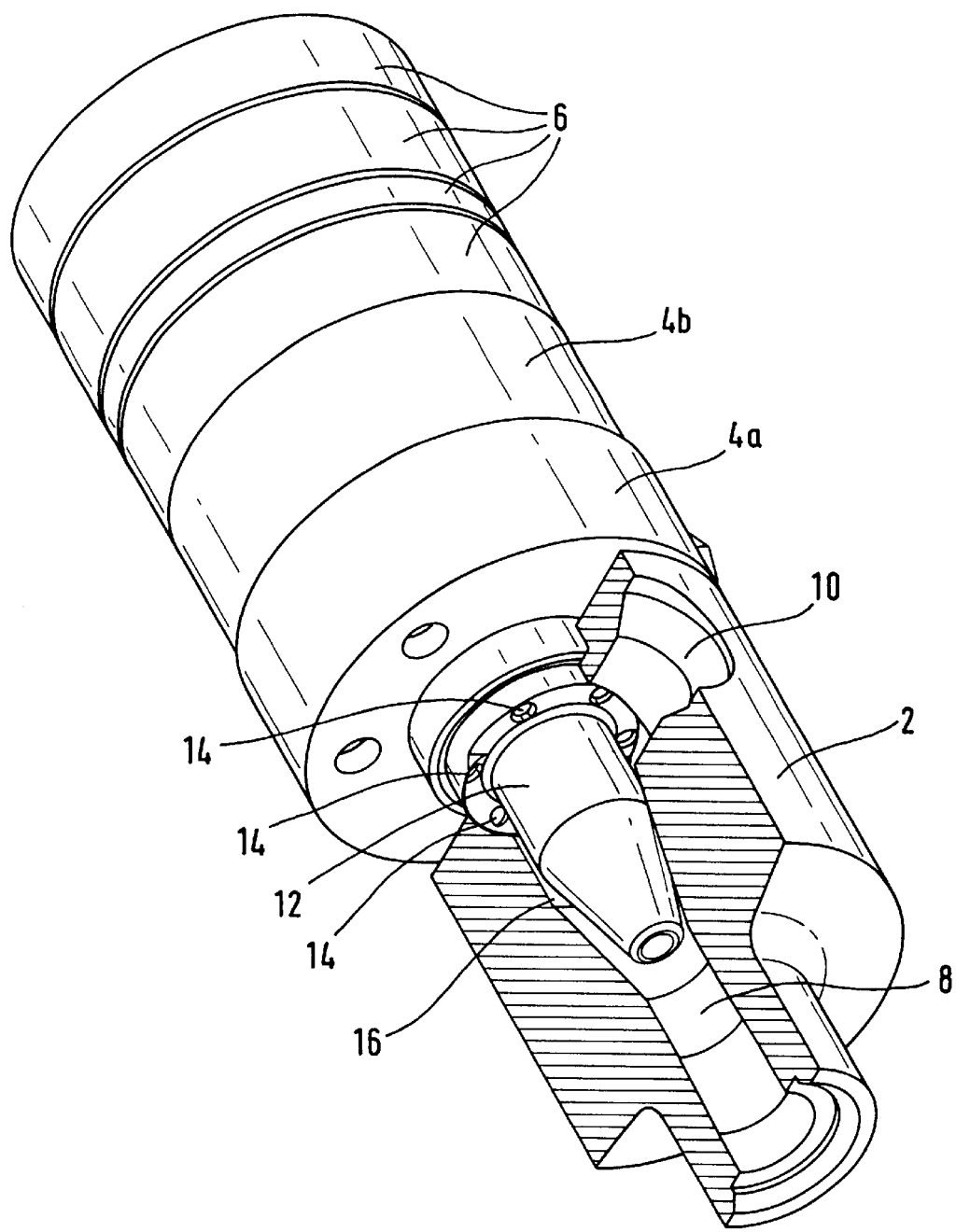
FIG. 1 shows a partial cross sectional view, in perspective, of a first embodiment of the apparatus according to the invention.

The apparatus according to the invention for premixing additives and for feeding them into a polymer melt stream has a conducting element with a first channel and a second channel, the second channel opening into the first channel (and therefore in fluid connection with it) at a point on the side of the first channel. The conducting element is installed in a line through which the polymer melt stream is conducted so that the polymer melt flows through the second channel and the first channel.

The apparatus further comprises a planetary gear pump with at least n=3 planet wheels with feed and discharge channels leading to and from the pump. One feed and one discharge channel are assigned to each planet wheel of the planetary gear pump. At least one and a maximum of n −1 feed channels are designed as additive feed channels, and the remaining feed channels are designed as polymer melt feed channels. An "additive feed channel" is understood to mean a channel through which an additive can be introduced into the planetary gear pump by an appropriate apparatus. The polymer melt feed channels, however, are connected to the polymer melt stream at one end and to the planetary gear pump at the other end.

The apparatus according to the invention further comprises a feed element that is in fluid connection with the discharge channels. The feed element extends into as in fluid connection with the first channel, thus forming a ring channel. The openings of the polymer melt feed channels opposite the planetary gear pump are arranged around the feed element, The feed element can be a tubular end piece (such as a nozzle) in which case the ring channel is then the space surrounding the feed element between the outer wall of the feed element and the wall of the first channel. The ring channel does not necessarily have to be circular.

During operation, a portion of the polymer melt is drawn from the polymer melt stream through the openings of the polymer melt feed channels and sent to the planetary gear pump. Because the openings of the polymer melt feed channels are distributed around the feed element, the polymer melt is drawn out of the ring channel uniformly. This design lacks areas in which the polymer melt could reside for long periods of time or form deposits as a result of a lack of movement. In addition, the complexity of the apparatus required for the apparatus according to the invention is reduced because the portion of the polymer melt to be treated is removed at the same place to where it returns after it has been treated with additives. That is, the portion of the polymer melt in question is removed and returned in the same connector. The only component that must be installed in the main line of the polymer melt stream is the conducting element of the apparatus according to the invention; the two connectors required in prior art apparatuses to remove and return the partial stream are eliminated.

The openings of the polymer melt feed channels are preferably arranged symmetrically around the feed element so that a partial polymer melt stream can be drawn out of the polymer melt stream uniformly. The symmetrical arrangement can be either centrically symmetric or axially symmetric. Thus, the openings can be arranged in the form of a circle or an oval, for example, around the feed element.

Because the polymer melt stream flows first through the second channel and then also through the first channel, the greatest danger of polymer deposition exists in the area of the ring channel facing away from the second channel. Therefore, in a preferred embodiment of the apparatus according to the invention, the opening of a polymer melt feed channel is provided in this area.

In an advantageous embodiment of the apparatus according to the invention, an area of the feed element facing away from discharge channels is designed in the form of a cone. As a result, the flow of the polymer melt in the ring channel is made almost completely uniform.

In another embodiment of the apparatus according to the invention, the second channel is preferably arranged at a right angle to the first channel.

When there is only a relatively small number of additive feed channels, some of the discharge channels will be carrying only the pure polymer melt; for this reason, at least one static mixer is preferably provided between the discharge channels and the feed element in order to ensure more thorough mixing of the additive-containing polymer melt with the pure polymer melt. Even if all of the discharge lines are already carrying a mixture of additive and polymer melt, the static mixer helps improve the quality of the mixing.

In another advantageous embodiment of the apparatus according to the invention, two static mixers are provided, arranged in series in the flow direction. The discharge channels that carry a mixture of additive and polymer melt extend into the static mixer on the upstream side, whereas the discharge channels that carry pure polymer melt extend into the static mixer on the downstream side. An arrangement such as this leads to especially intensive mixing of the additives and the polymer melt.

To simplify maintenance, repair, and handling, it is advantageous for the planetary gear pump, the feed channels, the discharge channels, and the feed element to be connected rigidly to each other and to be attached by a common fastening means to the conducting element. If static mixers are provided, it is preferable for these to be rigidly connected to the above-cited elements also. The rigidly connected elements can be easily and quickly separated as a unit from the conducting element through which the polymer melt stream is flowing.

The fastening means preferably has a flange, so that the components in question can be flanged to the conducting element.

Figure 2:
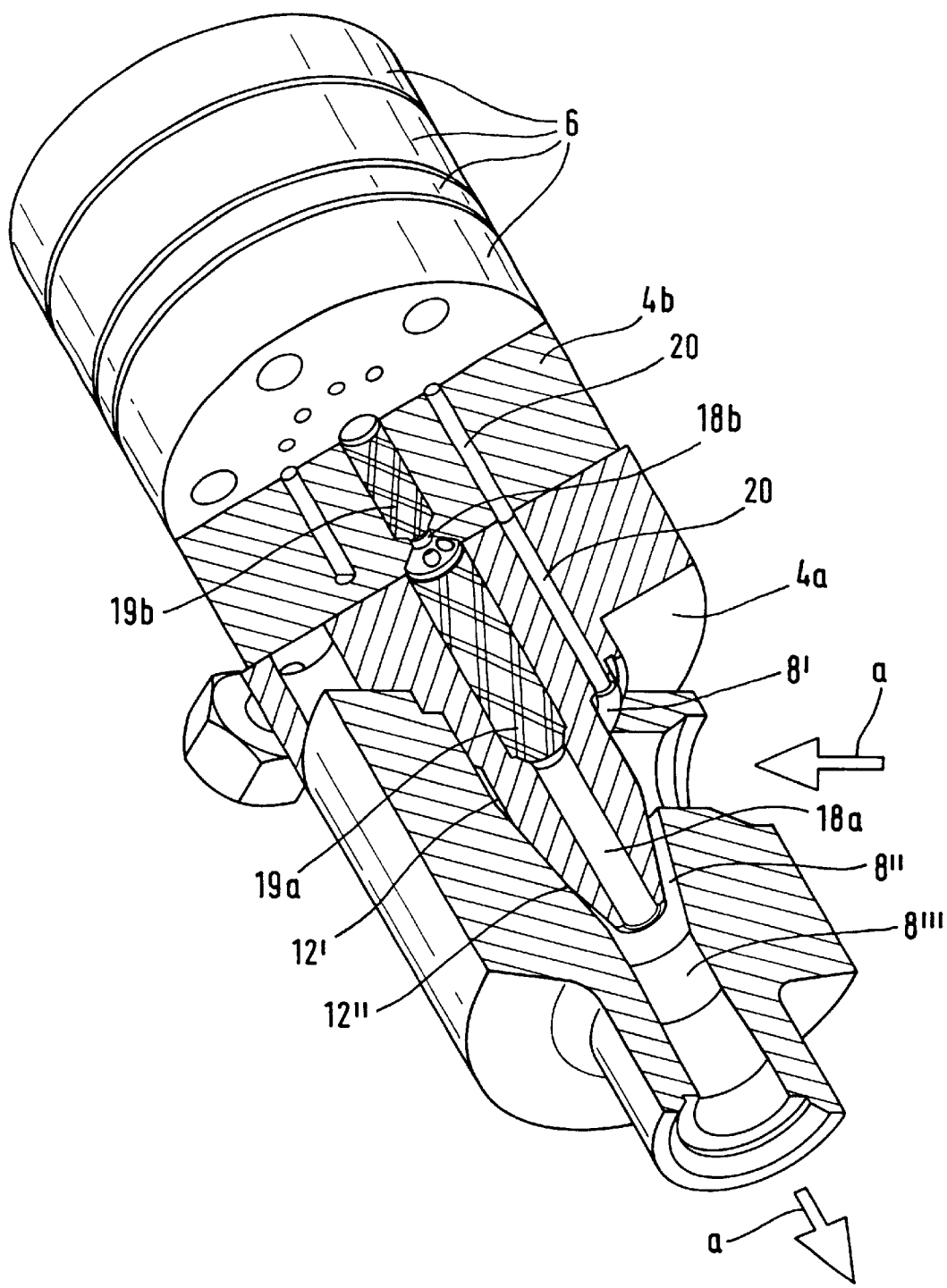
FIG. 2 shows another partial cross sectional view, in perspective, of the apparatus of FIG. 1.
Figure 3:
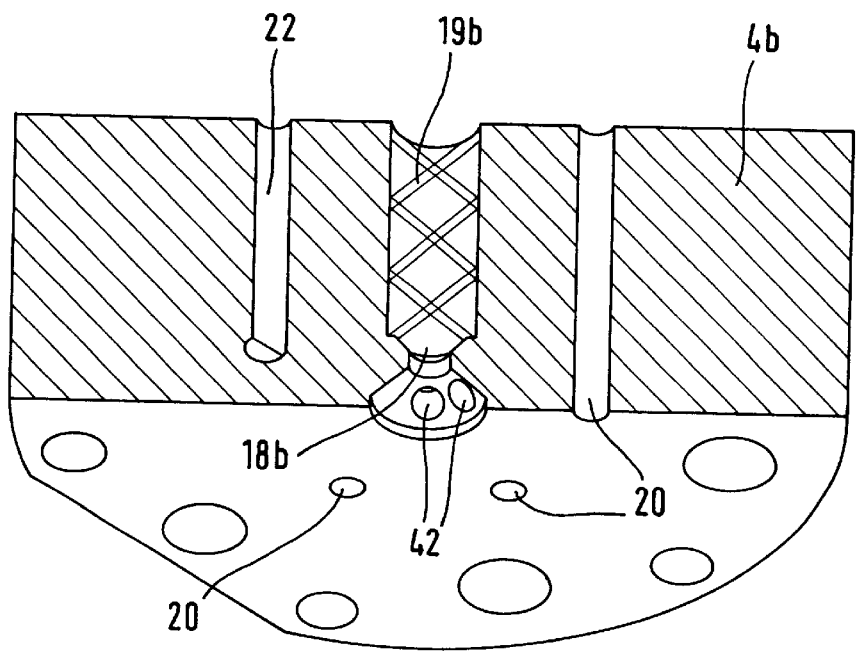
FIGS. 3–5 show partial cross-sectional views, in perspective, of the second intermediate element of FIGS. 1 and 2.
Figure 4:
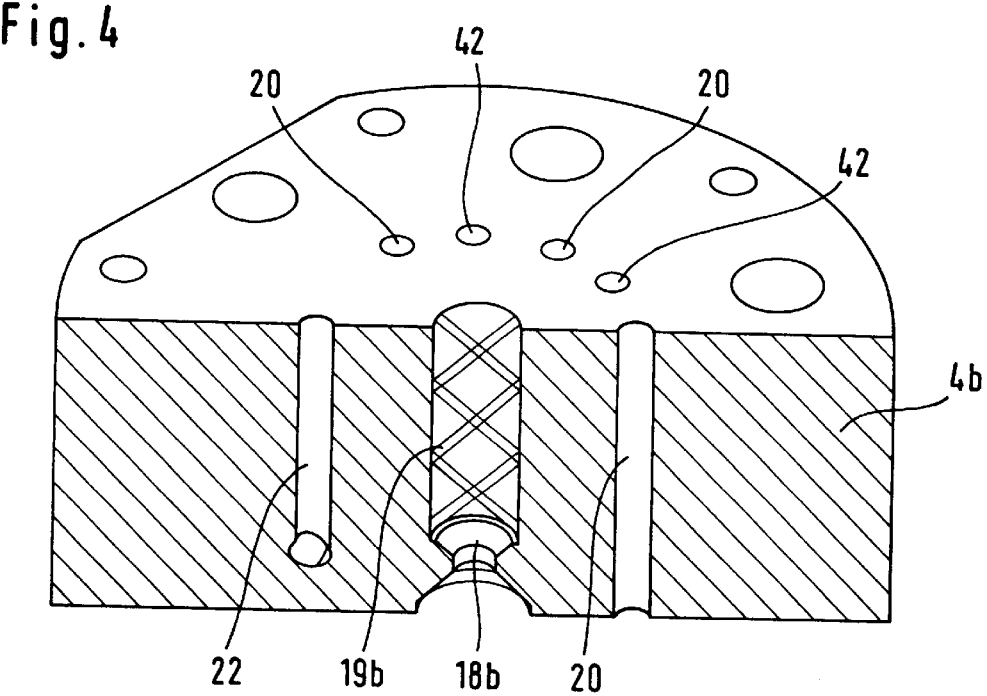

FIG. 1 shows a first embodiment of the apparatus according to the invention. The apparatus has a conducting element 2, first and second intermediate elements 4a and 4b, respectively, and a pump assembly 6, these elements being arranged one above the other in the order indicated. The conducting element 2 comprises a first channel 8, which extends axially through the entire conducting element 2, and a second channel 10. The second channel 10 extends from the outside surface of the conducting element 2 all the way to the first channel 8, the first and second channels 8 and 10 being at a right angle to each other. The first intermediate element 4a is designed essentially in the form of a circular disk and can thus be flanged to the conducting element 2 in such a way that the first channel 8 is sealed off at one end. The first intermediate element 4a has an essentially tubular feed element 12, which, starting from the point at which the first intermediate element 4a is flanged to the conducting element 2, extends into the first channel 8. Five openings 14 are provided in the downward-facing side of the first intermediate element 4a. These openings 14 belong to the feed channels 20 (FIG. 2). The openings 14 are arranged radially, preferably in symmetrical fashion (e.g., on a circle), around the feed element 12.

FIG. 2 shows another partial cross-sectional view, in perspective, of the apparatus according to FIG. 1. During the operation of the apparatus, the polymer melt stream (not shown) flows first through the second channel 10 and then through the first channel 8; the flow direction is indicated by the arrows a. The feed element 12 has a first section 12', which is designed essentially in the form of a cylinder, and a second section 12", facing away from the first intermediate element 4a; the second section tapers down conically in the flow direction. In a similar manner, the first channel has a first cylindrical section 8' and a conical second section 8". Between the walls of the first channel 8 and the outside wall of the feed element 12, a ring channel 16 is formed (FIG. 1), the flow cross section of which is essentially the same over its entire length. A third section 8''' follows along after the second section 8" of the first channel 8 in the flow direction, the flow cross section of this third section being the same as the flow cross section of the second channel 10.

Inside the feed element 12, a first feed channel 18a extends in the axial direction up as far as the side of the first intermediate element 4a to which the second intermediate element 4b is attached. A first static mixer 19a is provided in the part of the first feed channel 18a nearest the second intermediate element 4b. A second feed channel 18b, which is aligned with the first feed channel 18a, extends in the axial direction through the second intermediate element 4b. Another static mixer 19b is provided inside the second feed channel 18b. The static mixers 19a and 19b are indicated merely in schematic fashion; each can comprise, for example, several baffle elements offset from each other.

Figure 7:
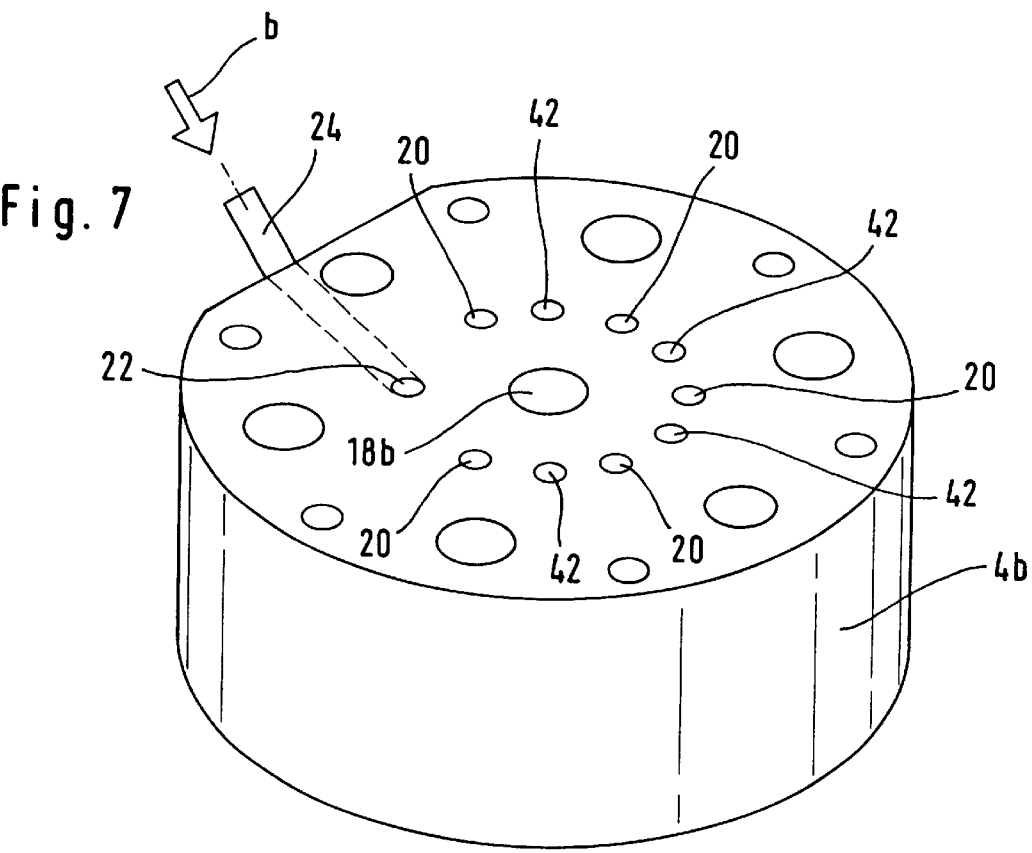

FIGS. 3–5 and FIGS. 6–7 show the second intermediate element 4b of FIG. 1 in the form of partial cross-sectional perspective views and non-cross-sectional perspective views, respectively. Five polymer melt feed channels 20 extend through the second intermediate element 4b parallel to the second feed channel 18b. These polymer melt feed channels 20 extend also through the first intermediate element 4a; their openings 14 can be seen in FIGS. 1 and 2. In addition, an additive feed channel 22 is provided, which extends outward as far as the outside surface of the second intermediate element 4b (FIG. 7), at which point the additive can be supplied through a line 24 or the like. The additive feed channel 22 is located inside the second intermediate element 4b to minimize the length of the flow route; the additive feed is indicated by the arrow b (FIG. 7).

Figure 8:
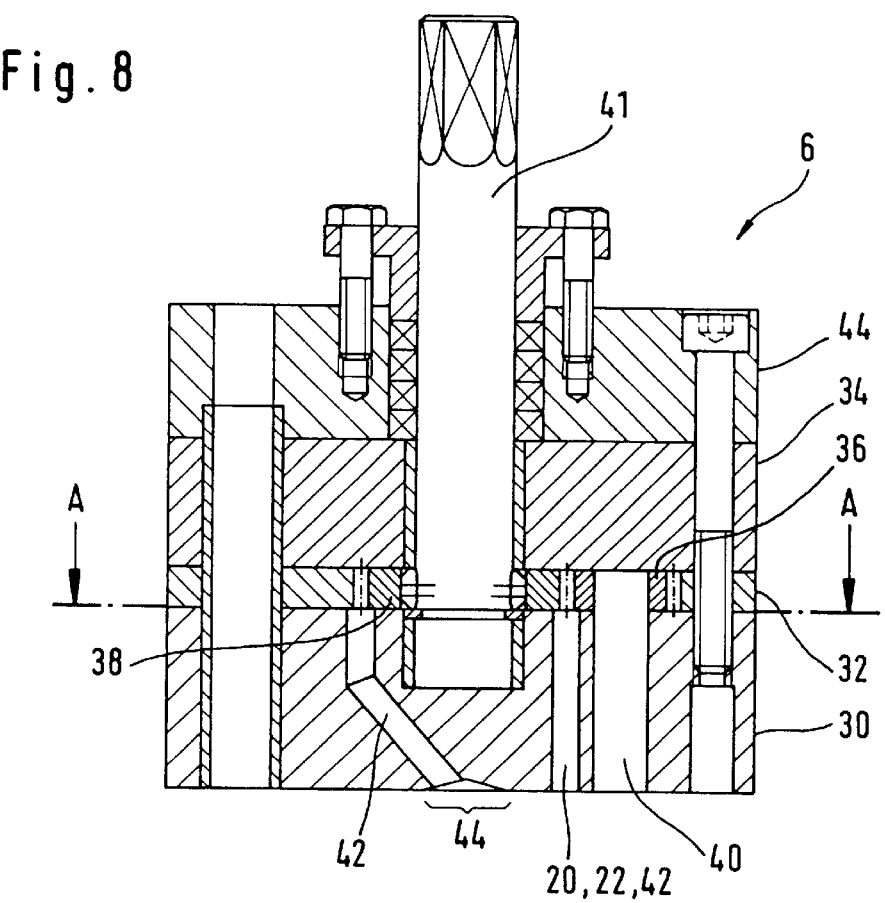
FIG. 8 shows a cross-sectional side view of the pump assembly of FIGS. 1 and 2.

FIG. 8 shows a cross-sectional side view of the pump assembly 6. The pump assembly 6 has a planetary gear pump with a lower plate 30, a middle plate 32, and an upper plate 34, where, in recesses in the middle plate 32, six planet wheels 36 (only one is shown) and a spur gear wheel 38 are arranged. Each of the planet wheels 36 is mounted on a rotating shaft 40, and the spur gear wheel 38 is mounted on a drive shaft 41. The drive shaft 41 extends through the upper plate 34 and then through a mounting plate 44 on top of that. A drive unit (not shown) for driving the drive shaft 41 is attached to the mounting plate 44.

Figure 9:
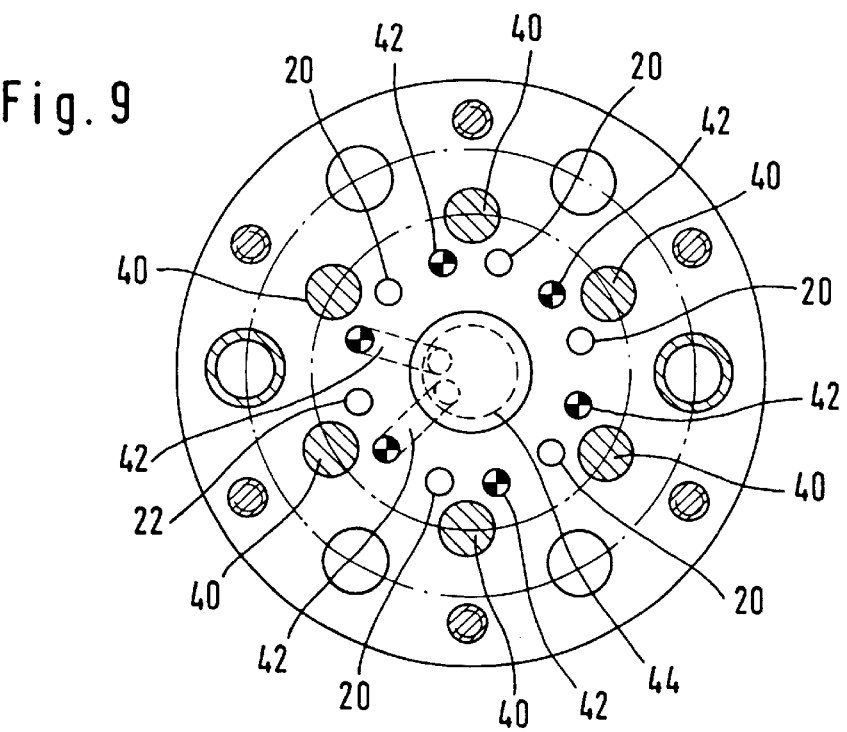
FIG. 9 shows a plan view of the cross-sectional plane A—A in FIG. 7.

It can be seen from FIG. 8 as well as from FIG. 9, which shows a plan view of the cross-sectional plane A—A of FIG. 8, that the polymer melt feed channels 20 and the additive feed channel 22 extend vertically upward through the lower plate 30 of the planetary gear pump as far as the area of the planet wheels 36, where they terminate. According to the principle of a planetary gear pump, the flow from a feed channel 20 or 22 is divided into two equal parts in the gaps between the teeth of the sun wheel and the teeth of the planet wheel. Accordingly, the two halves of two adjacent feed streams from the feed channels are assigned to a single discharge channel. The inlet opening of a discharge channel 42 is located in the immediate vicinity of each planet wheel 36. The discharge channels 42 extend through the lower plate 30 of the planetary gear pump. In this case the discharge channels 42 that also contain the additive extend inward at a slant, so that they terminate in a common area 44. The discharge channels 42 that are carrying only the polymer melt extend vertically through the lower plate 30. After the apparatus has been assembled, the area 44 and the upward-facing end of the second feed channel 18b line up with each other.

Figure 5:
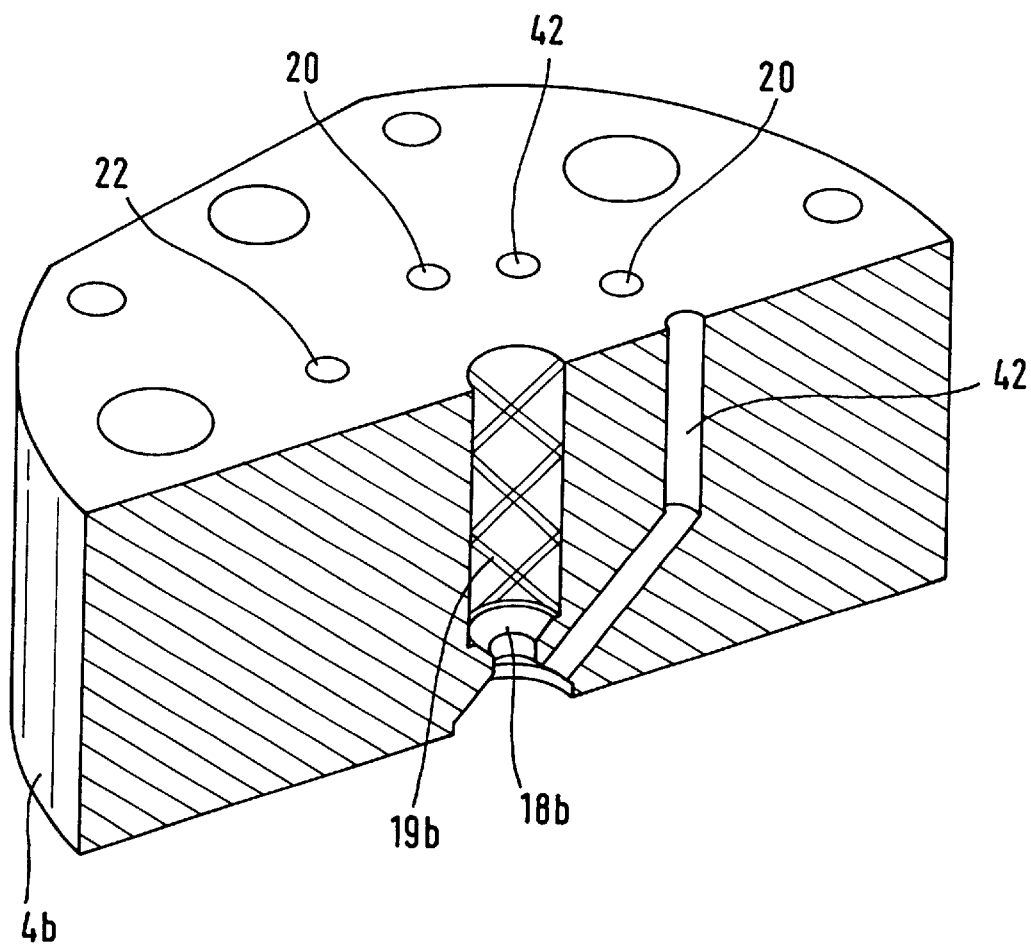
Figure 6:
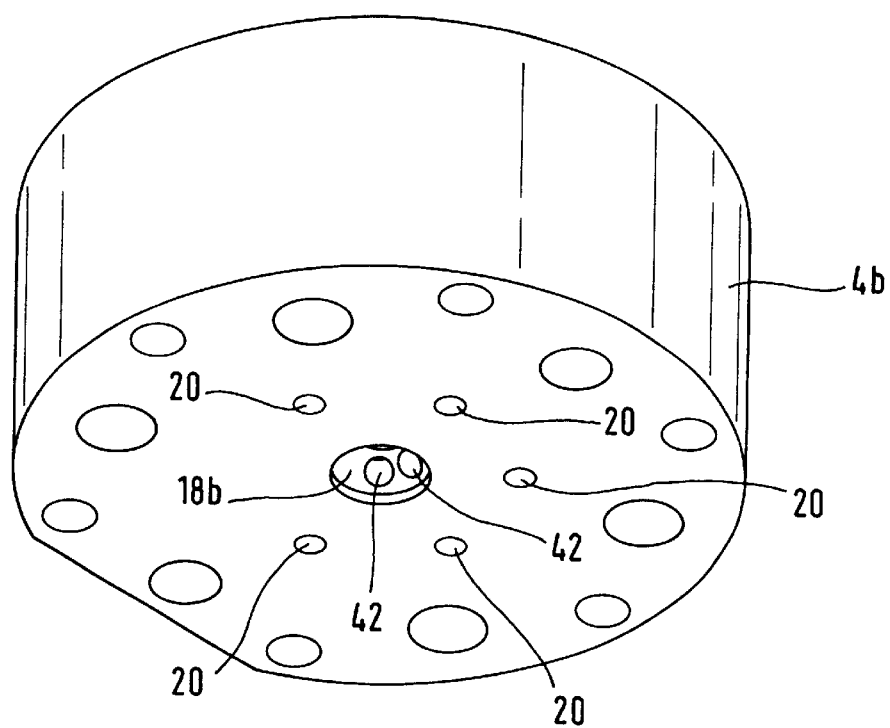
FIGS. 6–7 show views, in perspective, of the second intermediate element of FIGS. 3 and 4.

The way in which the apparatus according to the first embodiment works is described below. The polymer melt stream flows in the direction of the arrows a (FIG. 2) through the second and the first channels 10 and 8. The drive unit (not shown) operates the planetary gear pump (FIG. 8) via the drive shaft 41, as a result of which a portion of the polymer melt stream is drawn through the openings 14 (FIG. 1) into the polymer melt feed channels 20 (FIG. 2). In parallel with this, an additive is forced from the line 24 into the additive feed channel 22. Via the feed channels 20 and 22, the polymer melt and the additive arrive in the planetary gear pump (FIGS. 7 and 8). Inside the planetary gear pump, the gear wheels conveying the additive combine the additive and the polymer melt. Then an additive-polymer melt mixture flows through the two discharge channels 42 directly adjacent to the additive feed channel 22, whereas pure polymer melt flows back through the other discharge channels (FIG. 8). Via the discharge channels 42 carrying the additive-polymer melt mixture, the additive-polymer melt mixture arrives in the second static mixer 19b inside the second feed channel 18b (FIG. 2), where it is subjected to intensive mixing. Then the mixture thus produced emerges from the second feed channel 18b and arrives in the first feed channel 18a, where it is mixed with the polymer melt from the other discharge channels 42 (FIG. 5).

Instead of providing only one additive feed channel 22, one or more of the polymer melt feed channels 20 can also be used to feed additive to the planetary gear pump. The feed channels in this case are brought together in the second intermediate element 4b via a ring channel and supplied with additive via a common feed hole.

We claim:

1. An apparatus for premixing additives and feeding them into a polymer melt stream, the apparatus comprising:
   (a) a conducting element through which the polymer melt stream is conducted;
   (b) a planetary gear pump with at least n=3 planet wheels;
   (c) a feed channel and a discharge channel in fluid connection with each planet wheel, wherein at least one and a maximum of n−1 feed channels are additive feed channels and the remaining channels are polymer melt feed channels; and
   (d) a feed element, which is in fluid connection with the discharge channels;

wherein the conducting element has a first channel and a second channel that opens laterally into the first channel, and wherein the feed element extends into the first channel to form a ring channel, and wherein the openings of the polymer melt feed channels opposite the planetary gear pump are arranged around the feed element.

2. The apparatus according to claim 1, wherein the openings of the polymer melt feed channels opposite the planetary gear pump are arranged symmetrically around the feed element.

3. The apparatus according to claim 1, wherein an opening of a polymer melt feed channel facing away from the planetary gear pump is located in an area of the feed element facing away from the second channel.

4. The apparatus according to claim 1, wherein an area of the feed element facing away from the discharge channels is conical.

5. The apparatus according to claim 1, wherein the second channel is arranged at a right angle to the first channel.

6. The apparatus according to claim 1, wherein at least one static mixer is located between the discharge channels and the feed element.

7. The apparatus according to claim 6, wherein two static mixers arranged in series in the flow direction are provided, and wherein the discharge channels that carry a mixture of additive and polymer melt lead to the static mixer on the upstream side, whereas the discharge channels that carry the polymer melt extend into the static mixer on the downstream side.

8. The apparatus according to claim 6, wherein the planetary gear pump, the feed channels, the discharge channels, the feed element, and the static mixers are rigidly connected to each other and are attached by a common fastening means to the conducting element.

9. The apparatus according to claims 1, wherein the planetary gear pump, the feed channels, the discharge channels, and the feed element are rigidly connected to each other and are attached by a common fastening means to the conducting element.

10. The apparatus according to claim 9, wherein the fastening means has a flange.

* * * * *